United States Patent
Guzman et al.

(10) Patent No.: US 10,614,528 B2
(45) Date of Patent: Apr. 7, 2020

(54) SYSTEM AND METHOD FOR AUTOMATIC GENERATION OF REPORTS BASED ON ELECTRONIC DOCUMENTS

(71) Applicant: Vatbox, Ltd., Herzeliya (IL)

(72) Inventors: Noam Guzman, Ramat Hasharon (IL); Isaac Saft, Kfar Neter (IL)

(73) Assignee: VatBox, Ltd., Herzeliya (IL)

( * ) Notice: Subject to any disclaimer, the term of this patent is extended or adjusted under 35 U.S.C. 154(b) by 0 days.

(21) Appl. No.: 16/232,526

(22) Filed: Dec. 26, 2018

(65) Prior Publication Data

US 2019/0130494 A1     May 2, 2019

Related U.S. Application Data

(63) Continuation of application No. 15/363,048, filed on Nov. 29, 2016, now Pat. No. 10,235,723.
(Continued)

(51) Int. Cl.

| | |
|---|---|
| *G06F 16/00* | (2019.01) |
| *G06Q 40/00* | (2012.01) |
| *G06F 16/93* | (2019.01) |
| *G06F 16/36* | (2019.01) |
| *G06F 16/583* | (2019.01) |

(Continued)

(52) U.S. Cl.
CPC .......... *G06Q 40/123* (2013.12); *G06F 16/23* (2019.01); *G06F 16/24* (2019.01); *G06F 16/248* (2019.01); *G06F 16/367* (2019.01); *G06F 16/5846* (2019.01); *G06F 16/93* (2019.01); *G06F 40/174* (2020.01); *G06F 40/186* (2020.01); *G06K 9/00449* (2013.01); *G06K 9/00469* (2013.01); *G06K 9/00483* (2013.01); *G06K 9/18* (2013.01); *G06Q 10/10* (2013.01)

(58) Field of Classification Search
CPC .... G06F 17/243; G06F 17/248; G06F 17/224; G06F 16/248; G06F 16/24; G06F 16/367; G06F 16/93; G06F 16/5846; G06F 16/23; G06Q 40/123

See application file for complete search history.

(56) References Cited

U.S. PATENT DOCUMENTS

| | | |
|---|---|---|
| 7,299,408 B1 | 11/2007 | Daconta et al. |
| 7,693,760 B1 | 4/2010 | Fiteni et al. |

(Continued)

OTHER PUBLICATIONS

The International Search Report and the Written Opinion for PCT/US2016/063917 dated Mar. 23, 2017, ISA/RU, Moscow, Russia.

*Primary Examiner* — Laurie A Ries
(74) *Attorney, Agent, or Firm* — M&B IP Analysts, LLC

(57) ABSTRACT

A system and method for automatically generating reports. The method includes: obtaining a first set of data of characteristics of an entity; selecting at least one database that stores reporting requirements for the entity; retrieving, based on the obtained first set of data, at least one reporting requirement from the selected at least one database; obtaining a second set of data that includes information to be reported; creating at least a template based on the at least one reporting requirement and the second set of data, wherein the at least a template is a structured dataset that includes at least one reporting parameter; generating at least one report based on the created at least a template and the second set of data; and, sending, to at least one reporting authority system, the at least one generated report.

20 Claims, 7 Drawing Sheets

Related U.S. Application Data

(60) Provisional application No. 62/261,355, filed on Dec. 1, 2015, provisional application No. 62/260,553, filed on Nov. 29, 2015.

(51) Int. Cl.

| | | |
|---|---|---|
| *G06K 9/00* | (2006.01) | |
| *G06F 40/174* | (2020.01) | |
| *G06F 40/186* | (2020.01) | |
| *G06K 9/18* | (2006.01) | |
| *G06F 16/23* | (2019.01) | |
| *G06F 16/24* | (2019.01) | |
| *G06F 16/248* | (2019.01) | |
| *G06Q 10/10* | (2012.01) | |

(56) References Cited

U.S. PATENT DOCUMENTS

| | | | |
|---|---|---|---|
| 7,827,079 B2 | 11/2010 | Feldman et al. | |
| 7,899,837 B2 | 3/2011 | Polo-Malouvier et al. | |
| 7,937,319 B2 | 5/2011 | Kennis et al. | |
| 8,024,339 B2* | 9/2011 | Barker | G06F 21/6245 |
| | | | 707/736 |
| 8,170,902 B2 | 5/2012 | Kennis et al. | |
| 8,205,895 B2 | 6/2012 | Chen et al. | |
| 8,743,712 B1 | 6/2014 | Herzi | |
| 8,762,253 B2* | 6/2014 | Ogundipe | G06Q 40/10 |
| | | | 705/37 |
| 2003/0115080 A1 | 6/2003 | Kasravi et al. | |
| 2003/0120528 A1 | 6/2003 | Kruk et al. | |
| 2004/0006403 A1 | 1/2004 | Bognanno | |
| 2004/0049473 A1 | 3/2004 | Gower et al. | |
| 2004/0267620 A1* | 12/2004 | Feldman | G06Q 20/12 |
| | | | 705/19 |
| 2005/0209876 A1* | 9/2005 | Kennis | G06Q 10/06 |
| | | | 726/1 |
| 2006/0036465 A1* | 2/2006 | O'Donnell | G06Q 10/00 |
| | | | 705/38 |
| 2006/0271379 A1* | 11/2006 | Resnick | G06Q 10/00 |
| | | | 715/780 |
| 2007/0100724 A1 | 5/2007 | Hollas et al. | |
| 2007/0112599 A1* | 5/2007 | Liu | G16H 15/00 |
| | | | 705/2 |
| 2007/0136345 A1 | 6/2007 | Blazejewski et al. | |
| 2007/0168382 A1 | 7/2007 | Tillberg et al. | |
| 2007/0203935 A1* | 8/2007 | de Souza | G06Q 10/10 |
| 2007/0294230 A1 | 12/2007 | Sinel et al. | |
| 2008/0082374 A1 | 4/2008 | Kennis et al. | |
| 2008/0082375 A1 | 4/2008 | Kennis et al. | |
| 2008/0126155 A1 | 5/2008 | Xu et al. | |
| 2009/0070338 A1* | 3/2009 | Spitzig | G06Q 10/06 |
| 2009/0112743 A1* | 4/2009 | Mullins | G06Q 30/04 |
| | | | 705/31 |
| 2009/0228777 A1 | 9/2009 | Henry et al. | |
| 2010/0017316 A1 | 1/2010 | Joseph et al. | |
| 2010/0211609 A1* | 8/2010 | Xiong | G06F 16/3344 |
| | | | 707/803 |
| 2011/0208663 A1 | 8/2011 | Kennis et al. | |
| 2013/0211975 A1* | 8/2013 | Masterson | G06Q 40/125 |
| | | | 705/28 |
| 2013/0262328 A1* | 10/2013 | Federgreen | G06Q 10/10 |
| | | | 705/317 |
| 2014/0046977 A1 | 2/2014 | Gopalakrishnan et al. | |
| 2014/0095270 A1* | 4/2014 | Roth | G06Q 10/06393 |
| | | | 705/7.39 |
| 2014/0149252 A1* | 5/2014 | Rabenold | G06Q 10/10 |
| | | | 705/26.35 |
| 2014/0156500 A1* | 6/2014 | Lassen | G06Q 40/025 |
| | | | 705/38 |
| 2014/0195555 A1* | 7/2014 | Kim | G06Q 10/10 |
| | | | 707/758 |
| 2014/0197490 A1* | 7/2014 | Nitta | H01L 29/0847 |
| | | | 257/343 |
| 2014/0244458 A1 | 8/2014 | Saft et al. | |
| 2014/0344271 A1* | 11/2014 | Bartram | G06F 16/285 |
| | | | 707/737 |
| 2015/0039651 A1 | 2/2015 | Kinsely et al. | |
| 2015/0046366 A1 | 2/2015 | Phadke | |
| 2015/0127534 A1* | 5/2015 | Bhambhani | G06Q 20/405 |
| | | | 705/44 |
| 2015/0220649 A1* | 8/2015 | Papa | G06F 16/13 |
| | | | 707/722 |
| 2016/0004742 A1 | 1/2016 | Mohan et al. | |
| 2016/0012030 A1* | 1/2016 | Tran | G06F 17/243 |
| | | | 715/222 |
| 2016/0125237 A1* | 5/2016 | Ghatage | G06K 9/00463 |
| | | | 382/182 |
| 2017/0228821 A1* | 8/2017 | Reimer | G06Q 10/04 |

* cited by examiner

SYSTEM AND METHOD FOR AUTOMATIC GENERATION OF REPORTS BASED ON ELECTRONIC DOCUMENTS

CROSS-REFERENCE TO RELATED APPLICATIONS

This application is a continuation of U.S. patent application Ser. No. 15/363,048 filed on Nov. 29, 2016, now allowed. The U.S. Ser. No. 15/363,048 application also claims the benefit of U.S. Provisional Application No. 62/261,355 filed on Dec. 1, 2015 and U.S. Provisional Patent Application No. 62/260,553 filed on Nov. 29, 2015. The contents of the above-referenced applications are hereby incorporated by reference.

TECHNICAL FIELD

The present disclosure relates generally to data analysis, and more particularly to generating reports using image-based electronic documents.

BACKGROUND

As businesses increasingly rely on technology to manage data related to operations, suitable systems for properly managing and validating data have become crucial to success. Particularly for large businesses, the amount of data utilized daily by businesses can be overwhelming. Accordingly, manual review and validation of such data is impractical, at best. In addition to normal sales data, businesses in countries where value-added taxes (VATs) are applied collect and utilize even more data, thereby raising additional potential points of failure.

The challenges facing customers seeking a refund and, in particular, seeking VAT refunds, may result in customers becoming discouraged and failing to follow through on obtaining their refunds. This issue is further compounded when the customer is an employee of an enterprise because the customer is not directly benefiting from the refund. Moreover, employees may submit irrelevant or duplicate information that is unnecessary for seeking refunds. Filtering through such unnecessary information may be time-consuming, costly, and subject to a large degree of human error.

Additionally, many existing solutions for validating based on data face challenges in obtaining the data required for validation. Specifically, existing solutions typically require either structured data or data that otherwise adheres to particular format requirements (e.g., a required size of a scanned image, markings indicating validation-related information, etc.) in order to identify and utilize the data. Such existing solutions face challenges when appropriately formatted data cannot be obtained. In particular, such existing solutions may be unable to complete validation or may return inaccurate results (e.g., false positives and false negatives) when required data cannot be properly identified. Such issues may occur when, for example, data is unstructured or semi-structured, or when data is at least partially structured but in an unrecognizable format so as to effectively render the data unstructured for analysis purposes. These issues are compounded when multiple sets of data requirements (e.g., requirements for VAT refunds and for RCM validation) must be met. Manual checking to account for these issues is inefficient and introduces new potential sources of error.

Further, when information used for validation is contained in, for example, receipts or other physical documents, electronic documents associated with that information typically include images. Such image-based electronic documents require more storage than text-based documents, and utilize more computing resources to transmit.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for automatically generating reports. The method includes: obtaining a first set of data of characteristics of an entity; selecting at least one database that stores reporting requirements for the entity; retrieving, based on the obtained first set of data, at least one reporting requirement from the selected at least one database; obtaining a second set of data that includes information to be reported; creating at least a template based on the at least one reporting requirement and the second set of data, wherein the at least a template is a structured dataset that includes at least one reporting parameter; generating at least one report based on the created at least a template and the second set of data; and, sending, to at least one reporting authority system, the at least one generated report.

Certain embodiments disclosed herein also include a non-transitory computer readable medium having stored thereon instructions for causing a processing circuitry to perform a process, the process comprising: obtaining a first set of data of characteristics of an entity; selecting at least one database that stores reporting requirements for the entity; retrieving, based on the obtained first set of data, at least one reporting requirement from the selected at least one database; obtaining a second set of data that includes information to be reported; creating at least a template based on the at least one reporting requirement and the second set of data, wherein the at least a template is a structured dataset that includes at least one reporting parameter; generating at least one report based on the created at least a template and the second set of data; and, sending, to at least one reporting authority system, the at least one generated report.

Certain embodiments disclosed herein also include a system for automatically generating reports. The system comprises: a processing circuitry; and a memory, the memory containing instructions that, when executed by the processing circuitry, configure the system to: obtain a first set of data of characteristics of an entity; select at least one database that stores reporting requirements for the entity; retrieve, based on the obtained first set of data, at least one reporting requirement from the selected at least one database; obtain a second set of data that includes information to be reported; create at least a template based on the at least one reporting requirement and the second set of data, wherein the at least a template is a structured dataset that includes at least one reporting parameter; generate at least one report based on the created at least a template and the second set of data; and, send, to at least one reporting authority system, the at least one generated report.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
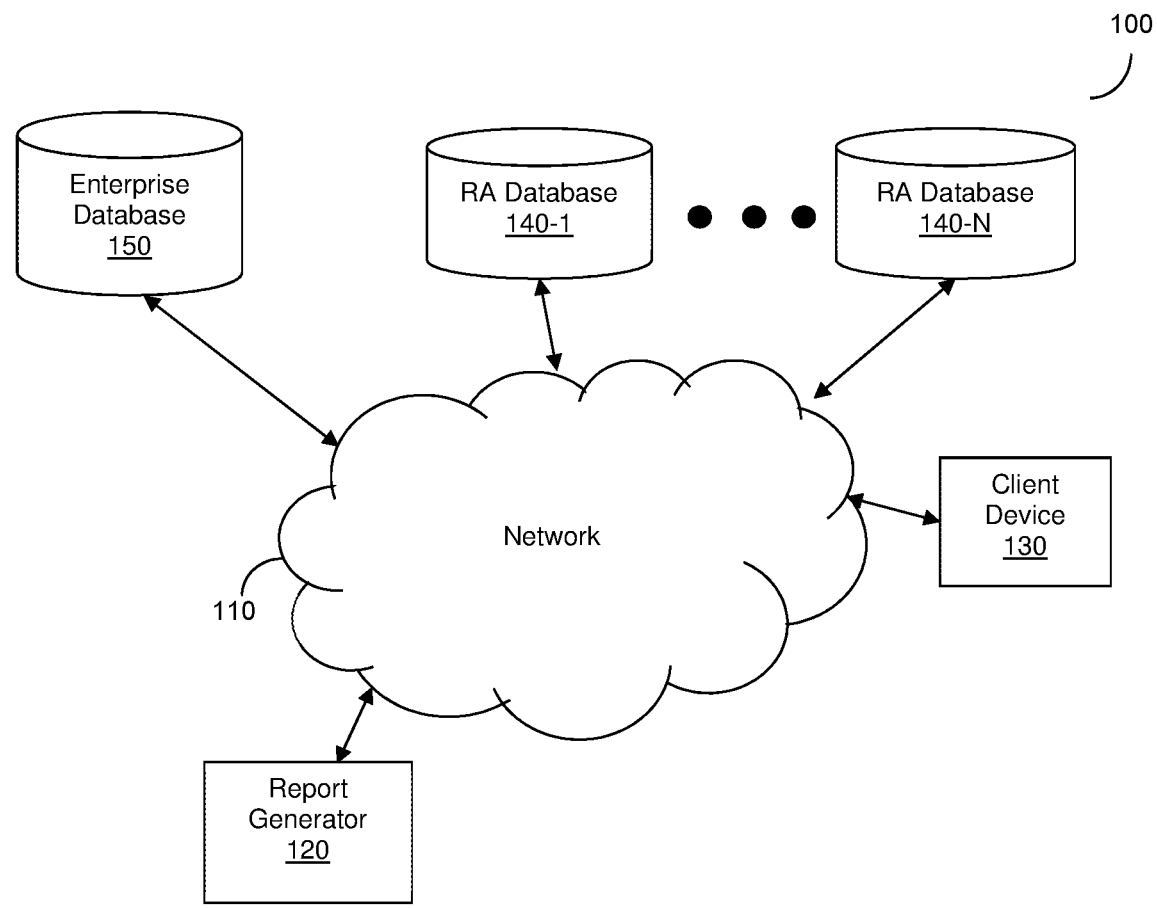
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for automatic generation of reports. In an embodiment, data indicating enterprise characteristics of an enterprise for which a report should be generated is obtained. Based on the obtained data, at least one database storing reporting requirements for the enterprise is selected and the reporting requirements are retrieved from the selected at least one database. Data including information to be reported is obtained. Based on the reporting requirements and the reporting information data, a template is created. Based on the created template, a report is generated. The report may be sent to, e.g., a system of a reporting authority. A notification indicating the generation may be generated and sent to, e.g., a client device.

FIG. 1 shows an example network diagram 100 utilized to describe the various disclosed embodiments. In the example network diagram 100, a report generator 120, a client device 130, a plurality of reporting authority (RA) databases 140-1 through 140-N (hereinafter referred to individually as a reporting authority database 140 and collectively as reporting authority databases 140, merely for simplicity purposes), and an enterprise database 150, are communicatively connected via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The reporting authority databases 140 may be, but are not limited to, regulatory databases storing data related to requirements for reporting. As a non-limiting example, the reporting authority database 140-1 may be a database of a tax agency that stores data indicating requirements for properly reporting VAT reclaim requests or other regulatory requirements. Such requirements may include, but are not limited to, a required type of regulatory report, required time pointers, required information (e.g., price, type of goods or services, etc.), and the like. The requirements may be stored in the form of, e.g., rules.

The enterprise database 150 stores data associated with an entity (e.g., a business or other enterprise, etc.). The entity data may include, but is not limited to, previously generated or filed reports, enterprise resource planning (ERP) data, consumer relationship management (CRM) data, enterprise characteristics, and the like. The enterprise characteristics may include, but are not limited to, whether the entity is a private corporation or a publicly traded corporation, revenues, profits, territories of operation, enterprise identifiers (e.g., an enterprise name, an enterprise identification number, a regulator reporting number, etc.), and the like. Any or all of the enterprise characteristics may be stored as metadata. The enterprise characteristics may be utilized to, e.g., determine reporting requirements.

The enterprise database 150 may further store electronic documents (e.g., an image file showing a scan of an invoice or other physical document, a text file, a spreadsheet file, etc.) including information used for reporting. Data included in the electronic document may be structured, semi-structured, unstructured, or a combination thereof. The structured or semi-structured data may be in a format that is not recognized by the validation system 120 and, therefore, may be treated like unstructured data.

In an embodiment, the report generator 120 is configured to collect the data indicating the enterprise characteristics from the enterprise database 150. In a further embodiment, based on the enterprise characteristics data, the report generator 120 is configured to select at least one of the databases 140 from which to retrieve reporting requirement data. As a non-limiting example, when enterprise characteristics of an enterprise indicate that the enterprise operates in Italy and in France, a reporting authority database 140-1 of an Italian regulatory agency and a reporting authority database 140-2 of a French regulatory authority are selected.

In an embodiment, the report generator 120 is configured to retrieve, from the selected at least one reporting authority database 140, a plurality of reporting requirements. In a further embodiment, the plurality of reporting requirements may be retrieved based on the enterprise characteristics. As a non-limiting example, the reporting requirements may be determined based on a geographic location of the enterprise, whether the enterprise is publicly or privately held, a net income of the enterprise, a gross income of the enterprise, a combination thereof, and the like.

In another embodiment, the retrieval of the reporting requirements may occur periodically based on, e.g., the enterprise characteristics and one or more retrieval rules. The retrieval rules may be predetermined. As a non-limiting example, if private enterprises are required to file a tax report annually and public enterprises are required to file a tax report quarterly, the retrieval rules may require annual retrieval and reporting for enterprises having private enterprise characteristics and quarterly retrieval and reporting for enterprises having public enterprise characteristics.

In an embodiment, the report generator 120 is configured to create datasets based on electronic documents including at least partially unstructured data. Data may be at least partially unstructured if it is or includes unstructured data, semi-structured data, structured data having an unknown structure, or a combination thereof. To this end, the report generator 120 may be further configured to utilize optical character recognition (OCR) or other image processing to determine data in the electronic document.

In an embodiment, the report generator 120 is configured to analyze the created datasets to identify reporting parameters indicated in the electronic documents. The reporting parameters include information required for reporting. As a non-limiting example, when reporting transactions for VAT refunding, the reporting parameters may include, but are not limited to, geographic location of purchase, type of goods or services purchased, amount spent, and the like. In some embodiments, the report generator 120 may be configured to verify an entity indicated in the created datasets. In another embodiment, the report generator 120 may be configured to determine whether the created datasets are eligible for reporting based on, e.g., whether the dataset meets at least one predetermined constraint.

In an embodiment, the report generator 120 is configured to create at least one template based on the created datasets. The template is a structured dataset including the identified reporting parameters. In a further embodiment, the report generator 120 is configured to apply, in real-time, at least one rule to the created template to determine if requirements for, e.g., validation are met by the transaction. In yet a further embodiment, the at least one template may be created based on the retrieved reporting requirements. In a further embodiment, each template may be created based on a different set of reporting requirements (e.g., a first template may be created based on reporting requirements of a first regulatory agency and a second template may be created based on reporting requirements of a second regulatory agency).

In an embodiment, based on the created at least one template, the report generator 120 is configured to generate at least one report. The at least one report indicates the identified reporting parameters. Utilizing a structured dataset template for generating a report reduces use of computing resources related to storing, transmitting, and analyzing datasets as compared to use of unstructured, semi-structured, or unknown structure data. In a further embodiment, generating the report may include completing at least one reporting form using the created at least one template.

In an embodiment, the report generator 120 may be configured to generate a notification. The report generator 120 may be further configured to send the notification, the generated report, or both, to, for example, the client device 130 communicatively connected to the network 110, a system associated with a regulatory agency, or both. The client device 130 may be, but is not limited to, a personal computer, a laptop, a tablet computer, a smartphone, a wearable computing device, or any other device capable of receiving and displaying notifications. The client device 130 may be, for example, a user device of a business engaged in a transaction that wishes to know whether the transaction is validated.

It should be noted that the embodiments described herein above with respect to FIG. 1 are described with respect to one enterprise database 150 merely for simplicity purposes and without limitation on the disclosed embodiments. Multiple enterprise databases may be equally utilized without departing from the scope of the disclosure.

Figure 2:
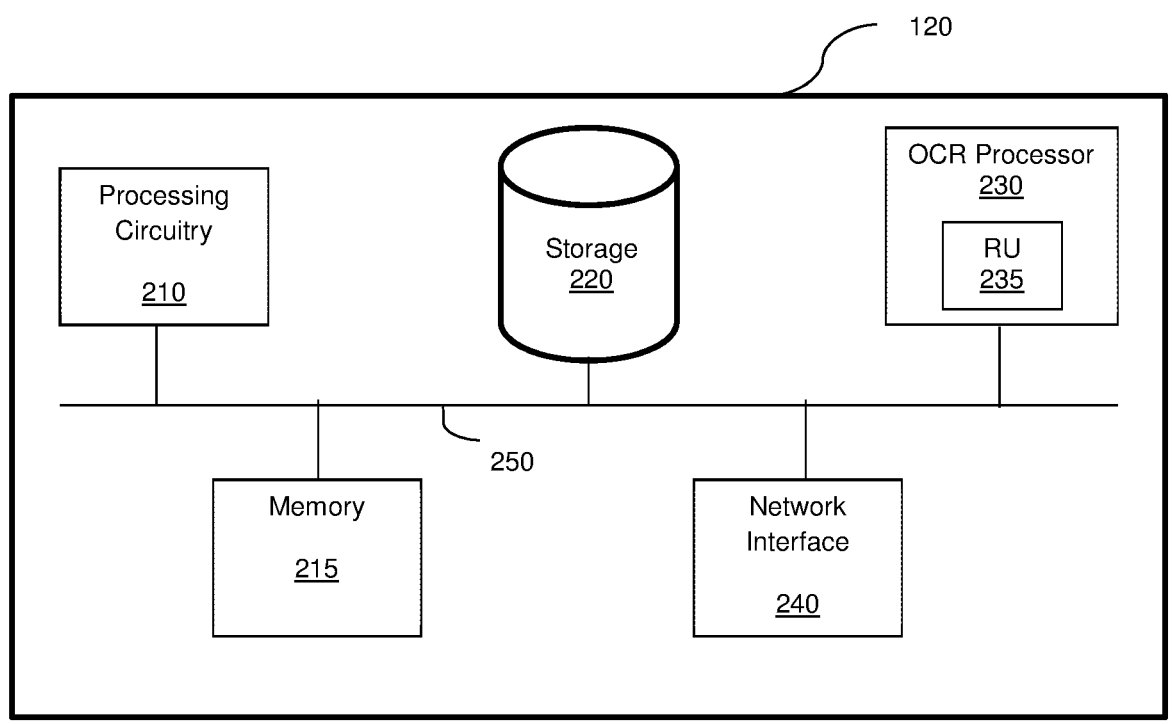
FIG. 2 is a schematic diagram of a report generator according to an embodiment.

FIG. 2 is an example schematic diagram of the report generator 120 according to an embodiment. The report generator 120 includes a processing circuitry 210 coupled to a memory 215, a storage 220, and a network interface 240. In an embodiment, the report generator 120 may include an optical character recognition (OCR) processor 230. In another embodiment, the components of the report generator 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform automatic generation of reports, as discussed herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The OCR processor 230 may include, but is not limited to, a feature and/or pattern recognition unit (RU) 235 configured to identify patterns, features, or both, in unstructured data sets. Specifically, in an embodiment, the OCR processor 230 is configured to identify at least characters in the unstructured data. The identified characters may be utilized to create a validation dataset including data required for validation of a transaction.

The network interface 240 allows the report generator 120 to communicate with the client device 130, the databases 140, the enterprise database 150, or a combination of, for the purpose of, for example, collecting metadata, retrieving data, sending reports and notifications, and the like. Additionally, the network interface 240 allows the report generator 120 to communicate with the client device 130 in order to send reports and notifications related thereto.

It should be understood that the embodiments described herein are not limited to the specific architecture illustrated in FIG. 2, and other architectures may be equally used without departing from the scope of the disclosed embodiments.

Figure 3:
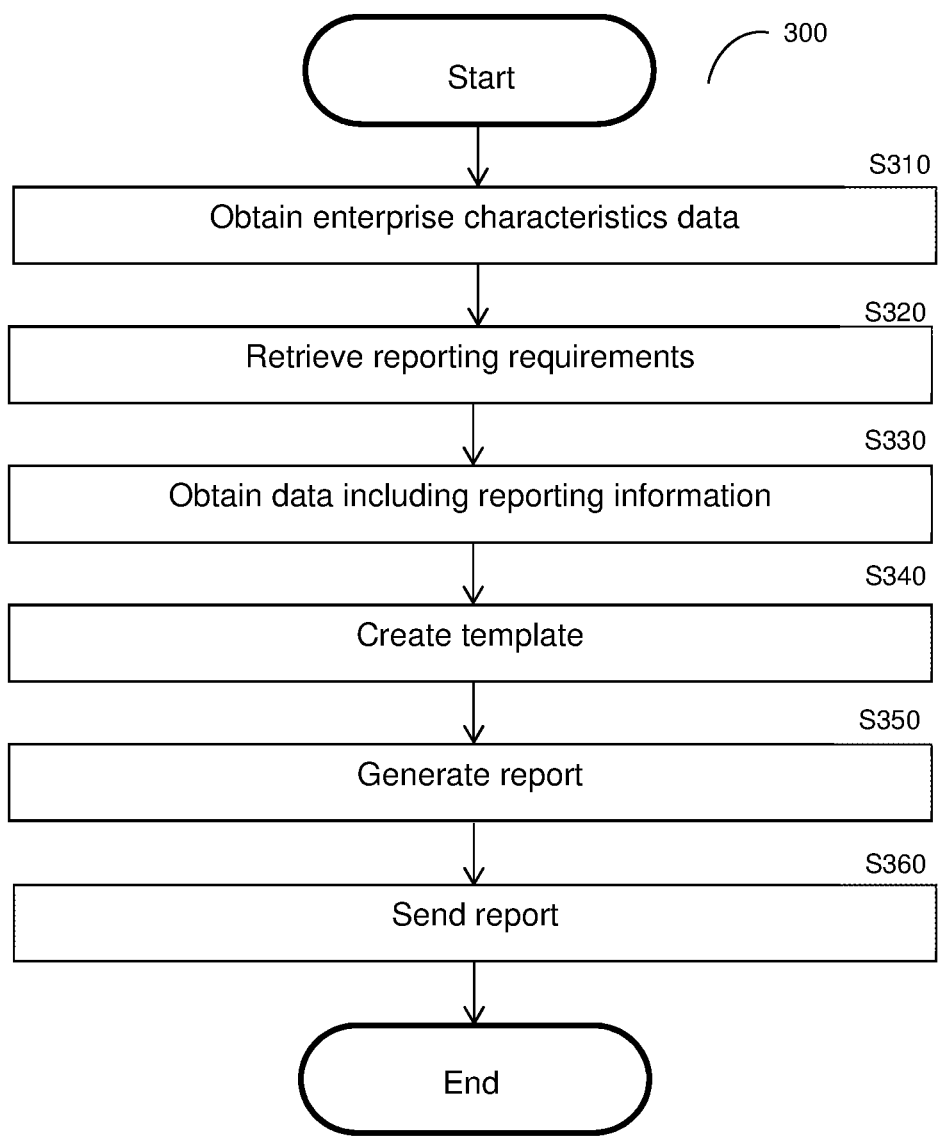
FIG. 3 is a flowchart illustrating a method for automatically generating and sending reports according to an embodiment.

FIG. 3 is an example flowchart 300 illustrating a method for automatically generating and sending reports based on enterprise data according to an embodiment. In an embodiment, the method may be performed by a report generator (e.g., the report generator 120).

At S310, entity characteristics data is obtained. The entity characteristics data may be collected from, e.g., an enterprise database (e.g., the enterprise database 150). In an embodiment, the entity characteristics data may be obtained periodically.

At S320, based on the obtained entity characteristics data, reporting requirements are retrieved. In an embodiment, S320 further includes selecting at least one database storing reporting requirements. The selected at least one database stores reporting requirements for reporting related to the enterprise. As a non-limiting example, when the entity characteristics data indicates that the enterprise is in Spain and a report related to VAT refunds is to be generated, a database storing reporting requirements for claiming VAT refunds in Spain may be selected and the reporting requirements for claiming VAT refunds in Spain are retrieved.

At S330, data including information to be reported is obtained based on the retrieved reporting requirements. The data may be obtained from, e.g., an enterprise database (e.g., the enterprise database 150). The obtained data may include at least one electronic document, and may be at least partially unstructured (i.e., the data may be or may include unstructured data, semi-structured data, or data lacking a recognized structure). Any of the electronic documents may be an image file.

At S340, a template is created based on the obtained data. The template is a structured dataset including key fields and values of the obtained data. Creation of templates based on at least partially unstructured data is described further herein below with respect to FIG. 4.

At S350, a report is generated based on the created template. In an embodiment, generating the report may include completing at least one reporting form. Generating reports based on templates is described further herein below with respect to FIG. 7.

At optional S360, the generated report may be sent to, for example, a client device (e.g., the client device 130), to a system of a reporting authority (e.g., a regulatory agency responsible for accepting and processing reports), or both. The sent report may be caused to be displayed on the client device 130. In another embodiment, S360 may include generating a notification indicating the generation of the report and sending the notification to, e.g., the client device 130. In a further embodiment, the notification may indicate, e.g., a deadline for filing the report.

In another embodiment, S360 may further include generating a dashboard for displaying the generated report, data related to the report (e.g., a data of sending of the report to the appropriate reporting authority), or both. A dashboard is an interactive management tool, an application programming interface (API), or both, used for displaying and managing reports.

It should be noted that the embodiments described herein above with respect to FIG. 3 are discussed with reference to creating a template and a report merely for simplicity purposes and without limitation on the disclosed embodiments. Multiple templates may be created, and for each template at least one report may be generated, without departing from the scope of the disclosure.

Figure 4:
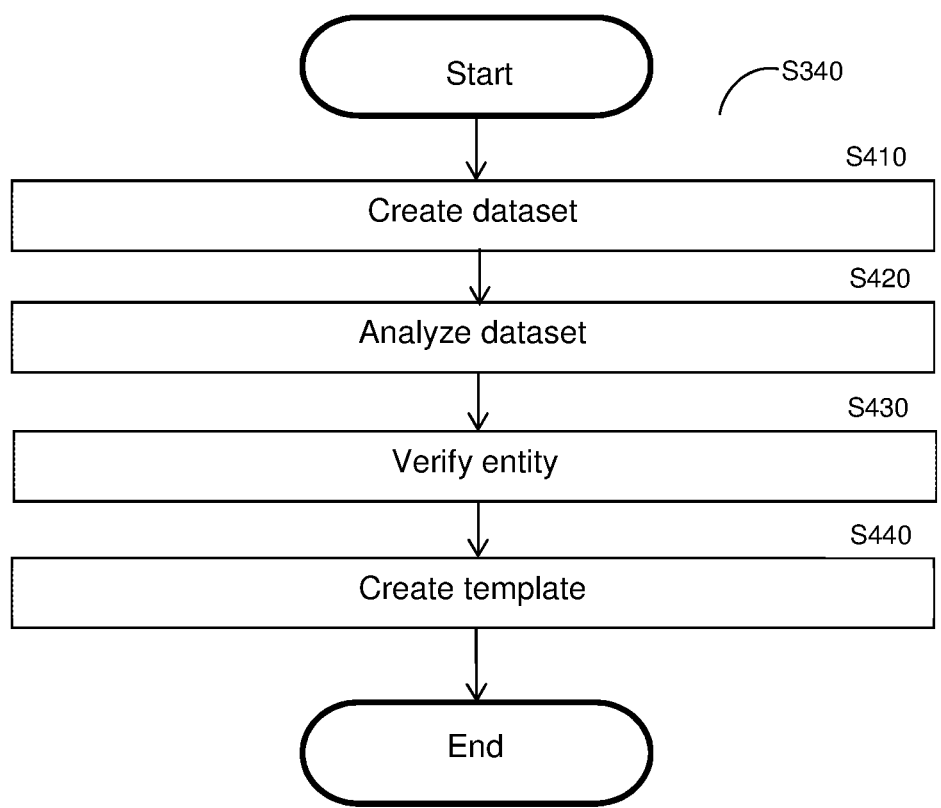
FIG. 4 is a flowchart illustrating a method for creating a template according to an embodiment.

FIG. 4 is an example flowchart S340 illustrating a method for creating a structured data template based on electronic documents including at least partially unstructured data according to an embodiment.

At S410, a dataset is created based on at least one electronic document including information to be reported. Each of the at least one electronic document may include at least partially unstructured data such as, but is not limited to, unstructured data, semi-structured data, structured data with structure that is unanticipated or unannounced, or a combination thereof. In an embodiment, S410 may further include analyzing the electronic document using optical character recognition (OCR) to determine data in the electronic document, identifying key fields in the data, identifying values in the data, or a combination thereof. Creating datasets based on electronic documents is described further herein below with respect to FIG. 5.

At S420, the created dataset is analyzed. In an embodiment, analyzing the dataset may include, but is not limited to, determining reporting parameters such as, but not limited to, at least one entity identifier (e.g., a consumer enterprise identifier, a merchant enterprise identifier, or both), information related to transactions (e.g., a date, a time, a price, a type of good or service sold, etc.), entity financial information, or a combination thereof. In a further embodiment, analyzing the dataset may also include identifying the transaction based on the dataset.

At optional S430, an entity indicated in the created dataset may be verified. The verification may be utilized to ensure, e.g., that the entity of the transaction is the entity for which a report should be generated. In an embodiment, the verification is based on the determined at least one entity identifier. In a further embodiment, S430 may include searching in at least one database based on the at least one identifier. Verifying entities of transactions based on datasets created using electronic documents dataset is described further herein below with respect to FIG. 6. In another embodiment, if the entity is not verified, it may be determined that the electronic document is not relevant to the reporting and a report may not be generated.

At S440, a template of the transaction is created. The template may be, but is not limited to, a data structure including a plurality of fields. The fields may include the identified transaction parameters. The fields may be predefined.

Creating templates from electronic documents allows for faster processing due to the structured nature of the created templates. For example, query and manipulation operations may be performed more efficiently on structured datasets than on datasets lacking such structure. Further, organizing information from electronic documents into structured datasets, the amount of storage required for saving information contained in electronic documents may be significantly reduced. Electronic documents are often images that require more storage space than datasets containing the same information. For example, datasets representing data from 100,000 image electronic documents can be saved as data records in a text file. A size of such a text file would be significantly less than the size of the 100,000 images.

Figure 5:
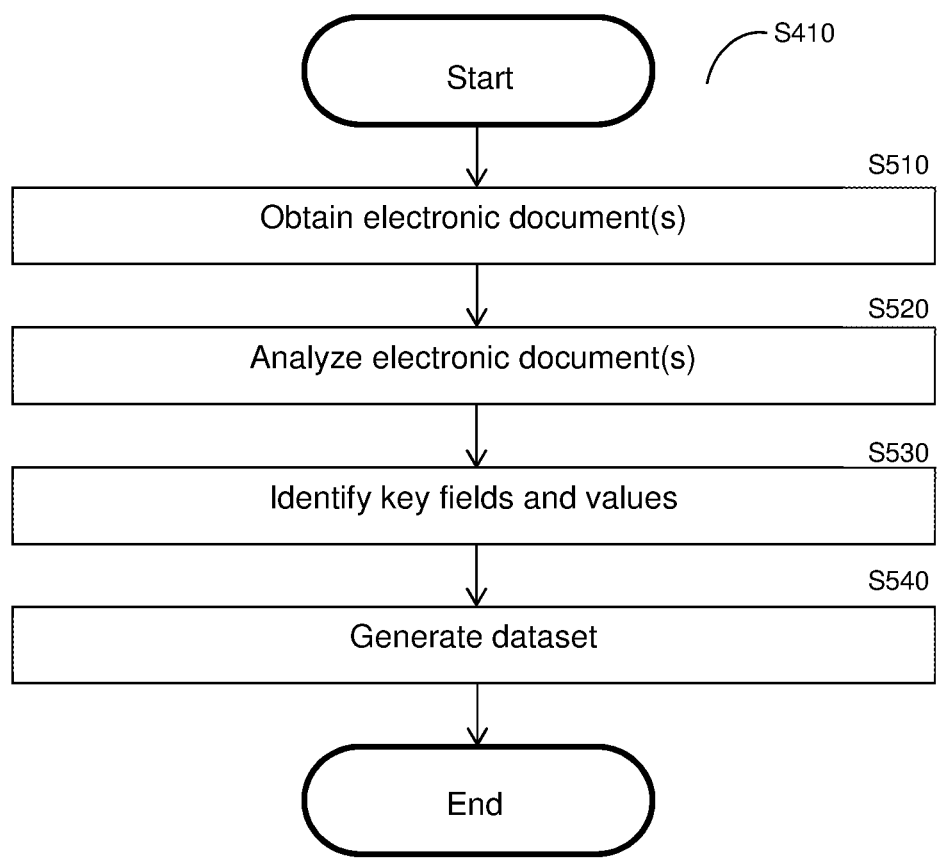
FIG. 5 is a flowchart illustrating a method for generating a dataset based on an electronic document according to an embodiment.

FIG. 5 is an example flowchart S410 illustrating a method for creating a dataset based on at least one electronic document according to an embodiment.

At S510, the at least one electronic document is obtained. Obtaining each electronic document may include, but is not limited to, receiving the electronic document (e.g., receiving a scanned image) or retrieving the electronic document (e.g., retrieving the electronic document from an enterprise system, a database, or both).

At S520, the at least one electronic document is analyzed. The analysis may include, but is not limited to, using optical character recognition (OCR) to determine characters in the electronic document.

At S530, based on the analysis, key fields and values in the electronic document are identified. The key field may include, but are not limited to, merchant's name and address, date, currency, good or service sold, a transaction identifier, an invoice number, and so on. An electronic document may include unnecessary details that would not be considered to be key values. As an example, a logo of the merchant may not be required and, thus, is not a key value. In an embodiment, a list of key fields may be predefined, and pieces of data that may match the key fields are extracted. Then, a cleaning process is performed to ensure that the information is accurately presented. For example, if the OCR would result in a data presented as "1211212005", the cleaning process will convert this data to Dec. 12, 2005. As another example, if a name is presented as "Mo$den", this will change to "Mosden". The cleaning process may be performed using external information resources, such as dictionaries, calendars, and the like.

In a further embodiment, it is checked if the extracted pieces of data are completed. For example, if the merchant name can be identified but its address is missing, then the key field for the merchant address is incomplete. An attempt to complete the missing key filed values is performed. This attempt may include querying external systems and databases, correlation with previously analyzed invoices, or a combination thereof. Examples for external systems and databases may include business directories, Universal Product Code (UPC) databases, parcel delivery and tracking systems, and so on. In an embodiment, S530 results in a complete set of the predefined key fields and their respective values.

At S540, a structured dataset is generated. The generated dataset includes the identified key fields and values.

Figure 6:
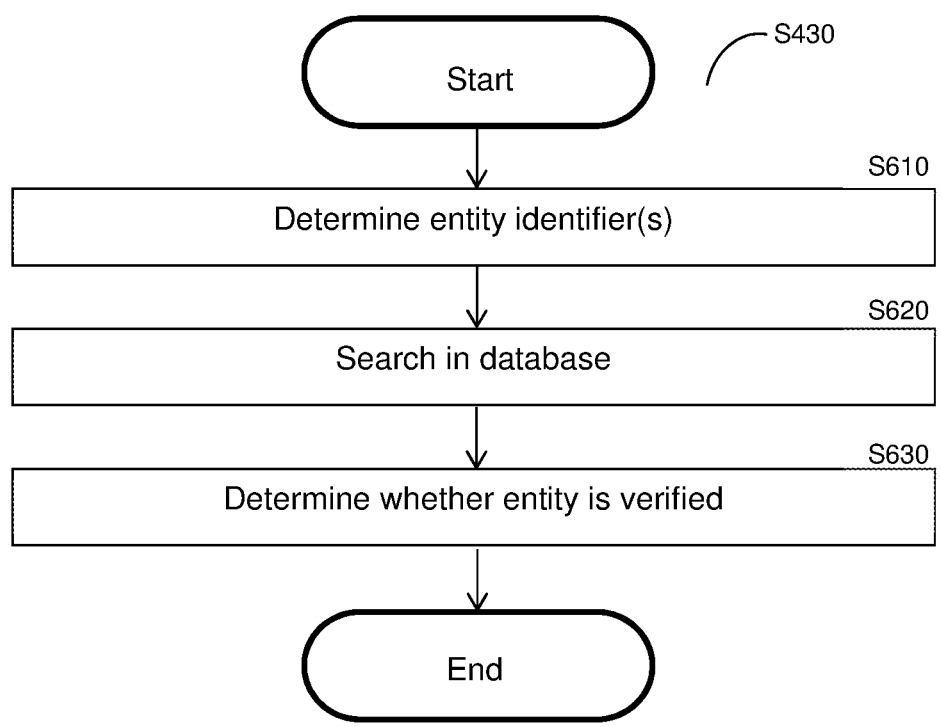
FIG. 6 is a flowchart illustrating a method for determining whether an entity is verified according to an embodiment.

FIG. 6 is an example flowchart S430 illustrating a method for verifying an entity based on a dataset including information to be reported according to an embodiment.

At S610, at least one entity identifier is determined based on at least one electronic document. Each entity identifier indicates a respective entity. The at least one entity identifier may be, but is not limited to, a name of the entity, a location of the entity (e.g., an address), or both.

At S620, at least one database is searched using the at least one entity identifier. The at least one database may include, but is not limited to, databases storing entity identifiers of registered business or other entities. In an embodiment, S620 may include determining the at least one database to be searched based on entity characteristics of the entity.

At S630, based on the search, it is determined whether the entity is verified. In an embodiment, the entity is verified if at least one of the entity identifiers was found in any of the at least one database.

Figure 7:
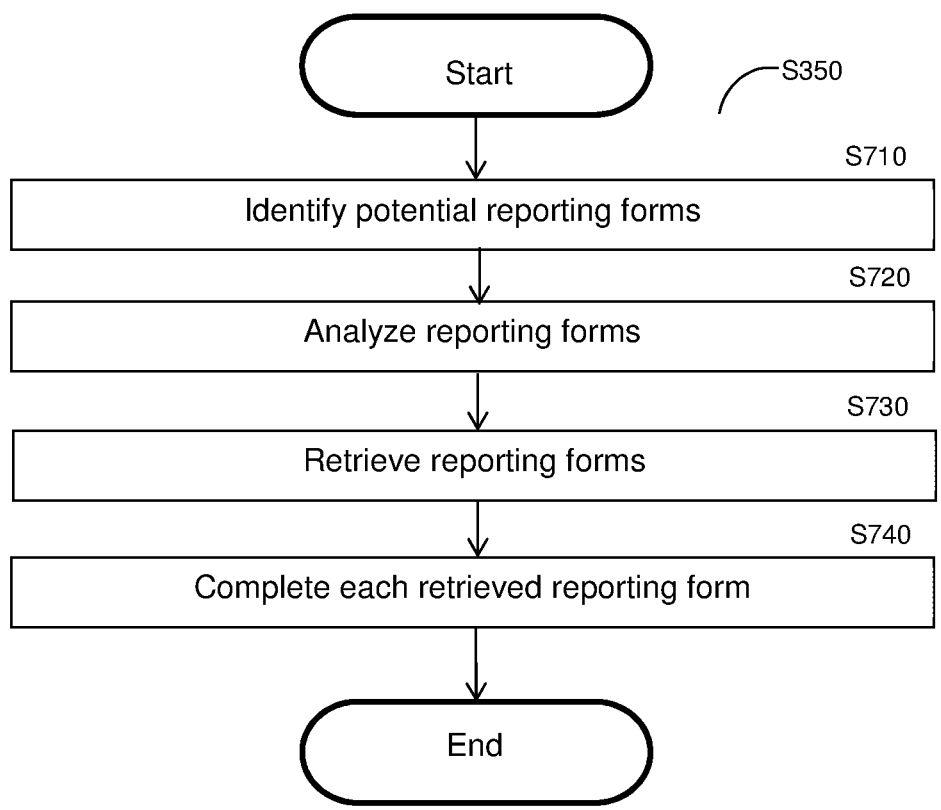
FIG. 7 is a flowchart illustrating a method for generating a report according to an embodiment.

FIG. 7 is an example flowchart S350 illustrating a method for generating a report according to an embodiment. In an embodiment, the report may be generated using reporting requirements obtained from, e.g., a reporting authority database. Thus, the generated report may differ depending upon the reporting requirements. As a non-limiting example, a report generated for a publicly traded enterprise may include different information than a report generated for a privately owned enterprise.

At S710, based on the reporting requirements, at least one reporting form potentially required for, e.g., meeting reporting regulations, is identified. The at least one potential reporting form may be retrieved from, e.g., one or more reporting authority databases (e.g., the reporting authority databases 140). In an embodiment, S710 includes crawling through the reporting authority databases for forms related to the reporting requirements. In a further embodiment, a form may be related to the reporting requirements if metadata for the form matches at least a portion of the reporting requirements above a predetermined threshold.

At S720, the identified at least one reporting form is analyzed to determine whether the report must include each reporting form. In an embodiment, S720 includes performing optical character recognition to identify key fields for providing reporting information. In a further embodiment, S720 further includes determining whether the identified key fields match the template above a predetermined threshold.

At S730, each reporting form that must be included in the report is retrieved from the reporting authority databases.

At S740, each retrieved reporting form is completed. In an embodiment, the obtained reporting forms are completed based on the created template. Using a structured dataset to complete reporting forms reduces use of computing resources as compared to use of at least partially unstructured datasets because data in structured datasets may be extracted and input into forms based on the structure and without analyzing an entire set of unstructured data.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for automatically generating reports, comprising:
   obtaining a first set of data of characteristics of an entity;
   selecting at least one database that stores reporting requirements for the entity;
   retrieving, based on the obtained first set of data, at least one reporting requirement from the selected at least one database;
   obtaining a second set of data that includes information to be reported;
   creating at least a template based on the at least one reporting requirement and the second set of data, wherein the at least a template is a structured dataset that includes at least one reporting parameter;
   generating at least one report based on the created at least a template and the second set of data; and
   sending, to at least one reporting authority system, the at least one generated report.

2. The method of claim 1, further comprising:
   obtaining, based on the retrieved reporting requirements, at least partially unstructured data, wherein the template is further created based on the obtained at least partially unstructured data.

3. The method of claim 2, further comprising:
   identifying, based on the at least partially unstructured data, at least one key field and at least one value;
   wherein the at least partially unstructured data includes at least one electronic document, wherein identifying the at least one key field and the at least one value further comprises:
   analyzing the at least one electronic document to determine data in the at least one electronic document; and
   extracting, based on a predetermined list of key fields, at least a portion of the determined data, wherein the at least a portion of the determined data matches at least one key field of the predetermined list of key fields.

4. The method of claim 3, wherein analyzing the at least one electronic document further comprises:
   performing optical character recognition on the electronic document.

5. The method of claim 3, further comprising:
   performing a cleaning process on the extracted at least a portion of the determined data.

6. The method of claim 1, wherein generating the report further comprises:
   completing at least one reporting form based on the generated template.

7. The method of claim 6, wherein generating the report further comprises:
   identifying, based on the retrieved reporting requirements, at least one potential reporting form; and
   analyzing each of the at least one potential reporting form to determine whether the generated report must include the potential reporting form, wherein the completed at least one reporting form includes each potential reporting form determined to be included in the generated report.

8. The method of claim 7, wherein the generated at least one report includes a value-added tax report, wherein the completed at least one reporting form includes a value-added tax reclaim request form.

9. The method of claim 6, further comprising:
   determining if the at least one reporting form is related to the at least one reporting requirement when metadata for the at least one reporting form matches at least a portion of the at least one reporting requirement above a predetermined threshold.

10. The method of claim 1, wherein:
    the information to be reported includes an electronic document that is obtained based on the at least one retrieved reporting requirement; and
    the at least one reporting requirement includes a requirement of a reporting authority at a geographic location where the entity is located.

11. A non-transitory computer readable medium having stored thereon instructions for causing a processing circuitry to perform a process, the process comprising:
    obtaining a first set of data of characteristics of an entity;
    selecting at least one database that stores reporting requirements for the entity;
    retrieving, based on the obtained first set of data, at least one reporting requirement from the selected at least one database;
    obtaining a second set of data that includes information to be reported;
    creating at least a template based on the at least one reporting requirement and the second set of data, wherein the at least a template is a structured dataset that includes at least one reporting parameter;
    generating at least one report based on the created at least a template and the second set of data; and
    sending, to at least one reporting authority system, the at least one generated report.

12. A system for automatically generating reports, comprising:
    a processing circuitry; and
    a memory, the memory containing instructions that, when executed by the processing circuitry, configure the system to:
    obtain a first set of data of characteristics of an entity;
    select at least one database that stores reporting requirements for the entity;
    retrieve, based on the obtained first set of data, at least one reporting requirement from the selected at least one database;
    obtain a second set of data that includes information to be reported;
    create at least a template based on the at least one reporting requirement and the second set of data, wherein the at least a template is a structured dataset that includes at least one reporting parameter;
    generate at least one report based on the created at least a template and the second set of data; and
    send, to at least one reporting authority system, the at least one generated report.

13. The system of claim 12, wherein the system is further configured to:
    obtain, based on the retrieved reporting requirements, at least partially unstructured data, wherein the template is further created based on the obtained at least partially unstructured data.

14. The system of claim 13, wherein the system is further configured to:
- identify, based on the at least partially unstructured data, at least one key field and at least one value;
- wherein the at least partially unstructured data includes at least one electronic document, wherein when identifying the at least one key field and the at least one value, the system is further configured to:
- analyze the at least one electronic document to determine data in the at least one electronic document; and
- extract, based on a predetermined list of key fields, at least a portion of the determined data, wherein the at least a portion of the determined data matches at least one key field of the predetermined list of key fields.

15. The system of claim 14, wherein the system is further configured to:
- perform optical character recognition on the electronic document.

16. The system of claim 14, wherein the system is further configured to:
- perform a cleaning process on the extracted at least a portion of the determined data.

17. The system of claim 12, wherein when generating the report, the system is further configured to:
- complete at least one reporting form based on the generated template.

18. The system of claim 17, wherein when generating the report, the system is further configured to:
- identify, based on the retrieved reporting requirements, at least one potential reporting form; and
- analyze each of the at least one potential reporting form to determine whether the generated report must include the potential reporting form, wherein the completed at least one reporting form includes each potential reporting form determined to be included in the generated report.

19. The system of claim 18, wherein the generated at least one report includes a value-added tax report, wherein the completed at least one reporting form includes a value-added tax reclaim request form.

20. The system of claim 17, wherein the system is further configured to:
- determine if the at least one reporting form is related to the at least one reporting requirement when metadata for the at least one reporting form matches at least a portion of the at least one reporting requirement above a predetermined threshold.

* * * * *